April 19, 1966    W. M. POSINGIES    3,246,863
CONTROL APPARATUS
Filed Oct. 25, 1962    3 Sheets-Sheet 1

INVENTOR.
WALTER M. POSINGIES
BY
ATTORNEY

INVENTOR.
WALTER M. POSINGIES
BY Roger W. Jensen
ATTORNEY

United States Patent Office 3,246,863
Patented Apr. 19, 1966

3,246,863
CONTROL APPARATUS
Walter M. Posingies, Minneapolis, Minn., assignor to Honeywell Inc., a corporation of Delaware
Filed Oct. 25, 1962, Ser. No. 233,111
14 Claims. (Cl. 244—52)

This invention pertains to attitude control systems and more particularly to fluid responsive attitude control systems.

The applicant's invention comprises a unique fluid attitude control system for a dirigible vehicle which utilizes unique fluid amplifier means. The applicant's fluid control system is capable of controlling the attitude of a vehicle about a plurality of axes. The applicant's invention will be described with reference to a specific embodiment in which the fluid control system controls the rate of a space vehicle about the pitch and yaw axes. The fluid responsive attitude control system utilizes a unique fluid amplifier which receives attitude control signals from rate sensors and directs a fluid stream to exhaust from the vehicle through at least one of several selective outlet ports so as to exert a reaction force or moment upon the vehicle.

The applicant's fluid operated attitude control system may also function to inject a fluid to obtain a secondary injection type of reaction control so as to control the attitude of the vehicle.

The applicant's fluid attitude control system provides substantial fluid (fuel) savings over prior art attitude control systems in addition to increased accuracy and increased reliability.

It is therefore an object of this invention to provide an improved fluid attitude control system.

This and other objects of the invention will become apparent from a study of the accompanying specification and claims in conjunction with the drawings in which:

Figure 1:
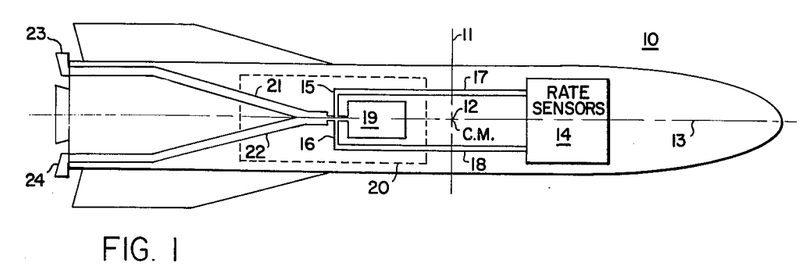
FIGURE 1 is a schematic representation of a dirigible vehicle utilizing the applicant's fluid attitude control system.

Referring now to FIGURE 1, reference numeral 10 generally depicts a dirigible vehicle such as a space craft utilizing the applicant's fluid responsive control system to control the attitude thereof about two axes. The center of mass of vehicle 10 is identified by the symbol CM. The yaw axis 11 of vehicle 10 is parallel to the plane of the drawing and is illustrated in FIGURE 1 as passing through the center of mass of the vehicle. The pitch or lateral axis 12 of vehicle 10 is perpendicular to yaw axis 11 and also perpendicular to the plane of the drawing. Pitch axis 12 is illustrated in FIGURE 1 as passing through the center of mass of vehicle 10. The roll or longtudinal axis 13 of vehicle 10 is perpendicular to both yaw axis 11 and to pitch axis 12 and is parallel to the plane of the drawing. Roll axis 13 is illustrated in FIGURE 1 as passing through the center of mass of vehicle 10. Rate sensors 14, selected to illustrate the invention although other types of sensors such as attitude sensors could be used, are provided for sensing the rates (angular velocity) applied to vehicle 10 about yaw axis 11 and pitch axis 12. Rate sensors 14 may be of the known vortex rate sensing type or may be of the floated rate gyro type. The only prerequisite for rate sensors 14 is that they provide a useable signal to the attitude control system indicative of the applied rate. Rate sensors are well known in the art and need not be described in detail here.

A fluid amplifier means 20 is schematically illustrated in FIGURE 1. The term fluid amplifier will be used in this application to define a type of fluid amplifier which facilitates the deflection and the control of a relatively high energy stream of fluid by another stream of fluid of relatively low energy. This definition does not include a vortex fluid amplifier. Fluid amplifier means 20 includes several control passages symmetrically positioned substantially in the same plane about roll axis 13. A pair of such control passages 15 and 16 are illustrated in FIGURE 1. Control passages 15 and 16 are connected to one of rate sensors 14 which senses the rate applied to vehicle 10 about pitch axis 12 by suitable conduit means 17 and 18 respectively. The control signals from the rate sensor associated with pitch axis 12 are thus supplied to control passages 15 and 16. The form of the control signals supplied to fluid amplifier means 20 will be described in more detail hereinafter. A supply passage 19 is provided in fluid amplifier means 20 and is adapted to supply a continuous stream of high pressure fluid thereto. Fluid amplifier means 20 also includes several outlet ports symmetrically positioned about roll axis 13. A pair of such outlet ports 21 and 22 associated with control of vehicle 10 about pitch axis 12 are illustrated in FIGURE 1 as alternatively controlled by passages 15 and 16. Although the applicant's unique fluid attitude control system is being explained with reference to a specific two axes control system, FIGURE 1 only illustrates the control passages and outlet ports of fluid amplifier means 20 required for control about pitch axis 12. The control passages and outlet ports required for control about yaw axis 11 are similar to those illustrated for pitch axis 12 but are at right angles thereto and are associated with supply passage 19. Fluid amplifier means 20 receives the control signals from rate sensors 14 and functions to direct substantially all of the fluid flow from passage 19 through one of the several outlet ports such as 21, 22, etc. at all times. That is, fluid amplifier means 20 provides a multistable output. The fluid flow in the outlet ports is exhausted from vehicle 10 through suitable exhaust or reaction nozzles so as to apply a moment about the center of mass CM of vehicle 10 and control the attitude thereof.

Outlet ports 21 and 22 are connected to exhaust or reaction nozzles 23 and 24 respectively. Fluid exhausting from exhause nozzle 23 will exert a reaction moment upon vehicle 10 about its pitch axis 12 in a counterclockwise direction as viewed in FIGURE 1. Fluid exhausting from exhaust nozzle 24 will exert a moment upon vehicle 10 about its pitch axis 12 in a clockwise direction.

It should be noted that although the applicant's fluid control system is being explained in a specific embodiment as controlling the attitude of a vehicle about two axes, namely pitch axis 12 and yaw axis 11, the attitude of a vehicle may be controlled about a plurality of or more than two axes.

Figure 2:
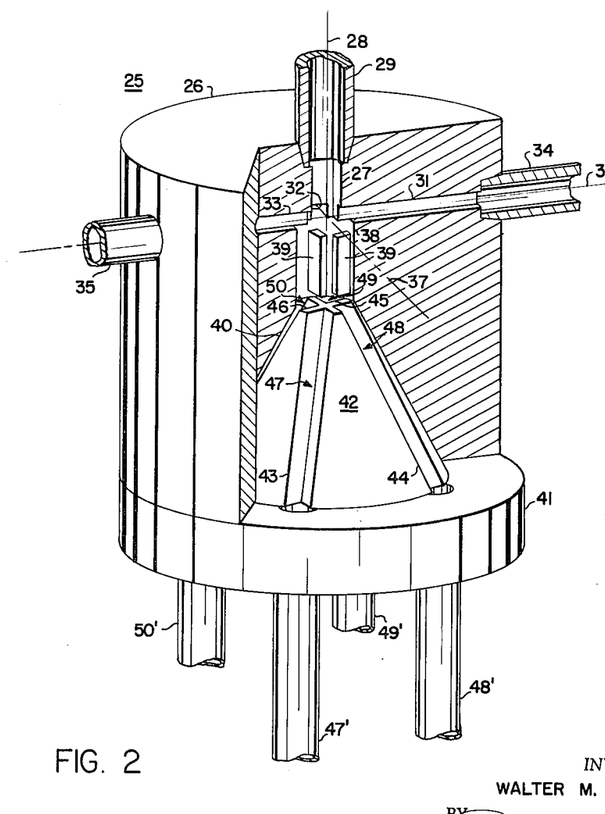
FIGURE 2 is a perspective view, partially in section, of a simplified two axes control fluid amplifier means utilized in the fluid operated attitude control system.

Referring now to FIGURE 2, reference numeral 25 depicts one embodiment of a fluid amplifier means utilized in the applicant's attitude control system. Fluid amplifier means 25 is the counterpart of fluid amplifier means 20 disclosed in FIGURE 1. Fluid amplifier means 25 comprises a cylindrical housing means 26 having a supply passage 27 therein. Supply passage 27 has a square cross section and the longitudinal axis thereof is identified by reference numeral 28. Axis 28 corresponds to the roll axis of a vehicle upon which fluid amplifier means 25 is mounted in the embodiment illustrated. It should be pointed out that the physical orientation of the applicant's unique fluid amplifier means relative to the craft is not critical to the operation of the control system. Supply passage 27 is adapted to be connected to a source of high pressure fluid by means of a connector 29.

Several control passages are positioned within housing means 26 in a plane formed by the pitch and yaw axes. Three low-pressure control passages 31, 32 and 33 are illustrated in FIGURE 2. Control passages 31, 32 and 33 are symmetrically positioned about axis 28 and are perpendicular thereto. It will be noted that a fourth control passage (not shown) is provided and is positioned diametrically opposed to passage 32. Control passages 31 and 33 define an axis 36, which corresponds to the pitch axis of a vehicle upon which fluid amplifier means 25 is mounted. Control passage 32 and its coacting control passage (not shown) define an axis 37 which corresponds to the yaw axis 37 of the vehicle. Control passages 31, 32 and 33 are all in communication with supply passage 27. Control passage 31 and its coacting control passage 33 are adapted to receive a control signal from a yaw axis rate sensor by means of connectors 34 and 35 respectively.

A cylindrical mixing chamber 38 is located within housing 26 concentric with axis 28 and adjacent to the plane of control passages 31, 32, and 33. Supply passage 27 and the several control passages including control passages 31, 32, 33 are in communication with mixing or crossover chamber 38. A pair of thin rectangular parallel-piped shaped baffles 39 are illustrated in FIGURE 2 as positioned within crossover chamber 38. A total of four such baffles 39 are positioned within the mixing chamber 38 with one narrow rectangular face of each baffle adjacent axis 28 although only two are illustrated. Two of the four baffles 39 are positioned so as to lie in a plane containing axis 28 and axis 36 and two baffles are positioned in a plane containing axis 28 and axis 37. The four baffles thereby divide chamber 38 into four distinct axial channels parallel to axis 28.

A conical exit chamber 40 is located within housing 26 concentric with axis 28 and adjacent to crossover chamber 38. Chamber 40 is in communication with crossover chamber 38.

A cylindrical base member 41 is rigidly attached to housing means 26. Base member 41 has an inner conically shaped element 42 centrally positioned thereon and rigidly attached thereto. Several generally longitudinally directed "V" shaped grooves 43, 44, 45 and 46 are located in the surface of conical element 42 and symmetrically positioned about the axis of element 42 which coincides with axis 28. The applicant however does not wish to be limited to the particular configuration of the grooves illustrated in FIGURE 2. Various other configurations are within the scope of the applicant's invention. Base member 41 and inner element 42 along with grooves 43–46 therein cooperate with conical outer exit chamber 40 so as to form several outlet ports. Four such outlet ports or passages are illustrated in FIGURE 2 and are identified by reference numerals 47, 48, 49 and 50. The outlet ports are symmetrically positioned about axis 28. The outlet ports 47, 48, 49, and 50 are positioned relative to the control passages 31, 32, 33 such that a longitudinal plane including axis 28 and one of the control passages, e.g., 32, bisects the angle between outlet ports 47 and 48. That is, the outlet ports are angularly displaced 45° from the control ports.

Other configurations of member 42 are within the scope of the invention, for example, baffles may be positioned upon member 42. It is also possible to remove member 42 and place baffles around the periphery of chamber 40 so as to define the several outlet ports.

An exhaust conduit is connected to base element 42 in communication with each of the several outlet ports 47, 48, 49, 50. The four exhaust conduits illustrated in FIGURE 2 are identified by reference numerals 47', 48', 49' and 50', and are in communication respectively with outlet ports or passages 47, 48, 49 and 50.

In operation, fluid amplifier means 25 functions to provide a multistable output in response to bistable control signals. A high energy fluid is supplied to supply passage 27, the fluid stream flowing coincident with axis 28. The opposed control passages 31 and 33 are connected to an angular rate sensor associated with yaw axis 37 of the vehicle to sense yaw rate and control passage 32 and its coacting control passage (not shown) which is diametrically opposed to control passage 32 are connected to an angular rate sensor associated with pitch axis 36 of the vehicle to sense pitch rate of vehicle 10.

If the vehicle 10, FIGURE 1, contained the amplifier of FIGURE 2 and with no side wind, the reaction ports 47, 48, 49, 50 would be controlled by amplifier 25 to provide bistable operation or on-off control. In the embodiment illustrated in FIGURE 2, the rate sensors provide bistable type control to the fluid amplifier passages or outlet ports. That is, the control signals are provided in a form referred to by those skilled in the art as pulse length modulation, while damping vehicle yaw rate with wind effects present.

With no lateral wind and with a slight residual oscillation or rate input about yaw axis 37, control passage 33 will have a greater pressure than control passage 31 for a unit of time and control passage 31 will have a greater pressure than control passage 33 for an equal unit of time. With merely residual pitch rate input, control passage 32 and its coacting control passage (not shown) function in a similar manner. The low energy control signals in each of the control passages are equal in magnitude although phase displaced.

With no yaw or pitch rates disturbance applied, the fluid supply stream flowing coincident with axis 28 is thus acted on, at all times, by two control signals of equal magnitude directed perpendicular to the stream. Thus, the control signals impinge upon the high energy fluid supply stream and direct it away from axis 28. The resultant supply stream fluid flow direction varies and lies in a plane defined by bisecting the angle between the two adjacent control passages and flows through the channel formed between baffles 39. In FIGURE 2, simultaneous control signals within control passages 31 and 32 for one unit of time would deflect the fluid stream so that the resultant flow would be through outlet port or passage 47, substantially all of the fluid flow exhausts from outlet port 47 during this unit of time. In the next unit of time, the control signals are reversed and are supplied to control passage 33 and its coacting control passage (not shown). It is clear that this would result in substantially all of the fluid flow exhausting from outlet port 49. Over a full time period of operation, zero resultant force or control moment is applied about axes 36 and 37.

It should be noted that substantially all of the fluid supplied to fluid amplifier means 25 exhausts out of only one of the outlet ports 47, 48, 49, 50 at any one time. For example, 90% of the fluid flow may exhaust out of outlet port 47, 4% out of outlet ports 48 and 50, and 2% out of outlet port 49.

One of the characteristics of a bistable type of fluid amplifier as in FIGURE 2 is that the fluid flow will continue in the same outlet port until the control pressure differential across the high pressure supply stream is reversed. That is, the control signal may be removed after directing fluid flow through a particular outlet port such as 47 and fluid flow will continue to exhaust through this outlet port until an opposite control signal is exerted upon the supply stream.

During a lateral wind when a rate input is sensed about yaw axis 37 of the vehicle, control passages 33 and 31 will alternately receive control signals of unequal time periods. The time period for which a control signal is supplied to either control passage 31 or 33 is a function of the magnitude of the rate input about axis 37. The maximum control signal will be fluid flow in one control passage, e.g., 33, at all times with zero flow in the other control passage, e.g., 31, and vice versa. With no rate input other than residual oscillation about pitch axis 36 of the vehicle, control passage 32 and its coacting control passage (not shown) will continue to receive control signals alternately of equal magnitude and of equal duration. Thus with a maximum signal from the yaw axis rate sensor a null or relatively small signal from the pitch axis rate sensor, the fluid flow from fluid amplifier means 25 with the signals in passages 32, 33 generally in phase will exhaust alternately through outlet ports 48 and 50 for different periods. The resultant force upon the vehicle would be a force applied about yaw axis 37 tending to oppose the rate applied to the vehicle. Ultimately the vehicle reaches a condition of slight oscillation about the yaw and pitch axes, with no wind present.

It is important to note that fluid amplifiers are continuous flow devices as contrasted to demand type devices wherein the fluid flows only upon demand. Consequently, in fluid amplifier means 25 there is a continuous fluid flow through supply passage 27, continuous secondary fluid flow through two of the control passages, and continuous fluid exhaust from one of the outlet ports. Since the amount of continuous fluid flow available to control a vehicle is critical, it should where possible be conserved. The applicant's improved fluid attitude control system requires less continuous fluid flow than any other prior art control system as will be shown. This is possible largely because of the utilization of unique simplified fluid amplifier means 25 in the control system. Fluid amplifier means 25 functions to receive the control signals and direct the fluid supply stream to exhaust through an outlet port which will provide the maximum utilization of the continuous fluid flow. The efficiency of the applicant's fluid attitude control system will now be compared with the prior art attitude control system with reference to FIGURES 4 and 5.

Figures 4, 5:
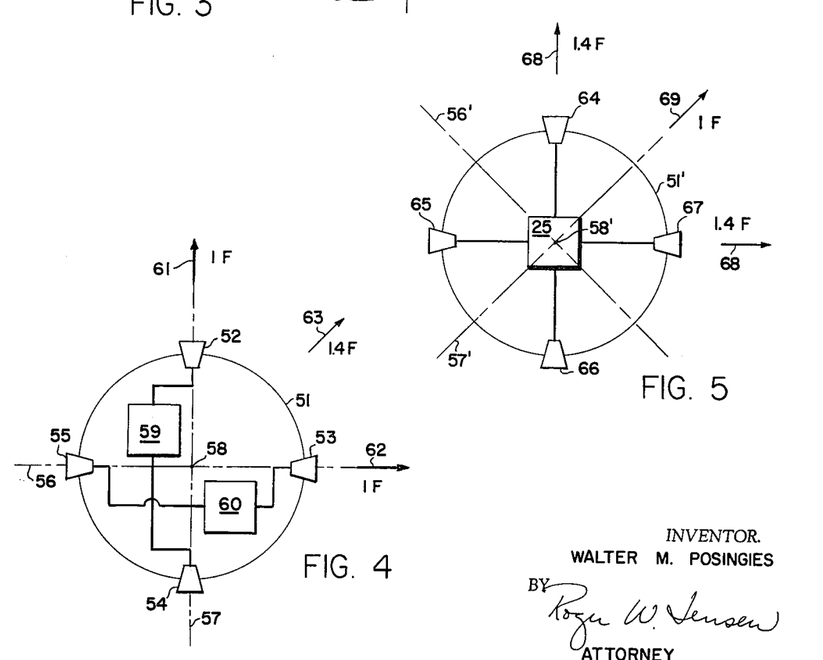
FIGURE 4 is a schematic representation of an end view of a vehicle utilizing a prior art control system.
FIGURE 5 is a schematic representation of an end view of a vehicle utilizing the applicant's fluid attitude control system.

FIGURE 4 is a schematic representation of a prior art bang-bang or on-off control system utilizing two structurally independent bistable fluid amplifiers to control a vehicle about two axes 56, 57. FIGURE 4 is a schematic end view of a vehicle 51 having four outlet reaction ports identified by reference numerals 52, 53, 54 and 55. The pitch axis of vehicle 51 lies in the plane of the drawing and is identified by reference numeral 56. The yaw axis 57 of vehicle 51 lies in the plane of the drawing perpendicular to pitch axis 56. The roll axis 58 is perpendicular to the plane of the drawing and perpendicular to pitch axis 56 and yaw axis 57. Outlet ports 52 and 54 are positioned upon axis 57 and control the attitude of vehicle 51 about its pitch axis 56. Outlet ports 52 and 54 are controlled by a single bistable fluid amplifier 59. Outlet ports 53 and 55 are positioned upon axis 56 and are controlled by a single bistable fluid amplifier 60. Outlet ports 53 and 55 control the attitude of vehicle 51 about its yaw axis 57. The two single bistable fluid amplifiers 59 and 60 are continuous flow devices. In order to compare the economy of the applicant's system and the prior art system, assume that the fluid amplifier 59 is continuously supplied with one unit of fluid energy and that fluid amplifier 60 is continuously supplied with one unit of fluid energy. Thus, the control system has a continuous flow of two units of fluid energy. Further assume for illustrative purposes that one unit of fluid energy creates a reaction force of one unit when exhausted from vehicle 51.

With merely residual oscillation rate input about pitch axis 56 and no lateral wind, fluid amplifier 59 by the bang-bang form of control directs one unit of fluid energy through outlet port 52 for one half unit of time and through outet port 54 for the other half unit of time. The net force about pitch axis 56 for a full unit of time is zero. Fluid amplifier 61 and outlet ports 53 and 55 operate in a similar manner relative to yaw axis 57. Thus, two units of fluid energy are continuously expended in the absence of any lateral wind rate input about pitch axis 56 or yaw axis 57 of vehicle 51.

The prior art attitude control system, illustrated in FIGURE 4 is capable of exerting a maximum instantaneous reaction force of one unit (1F) upon vehicle 51 by directing the one unit of fluid energy to exhaust through outlet port 52 or outlet port 54. If the fluid energy is directed out of outlet port 52, a reaction force of one unit (1F) will act upon vehicle 51 tending to orient it about its pitch axis 56. This force is illustrated by vector 61 in FIGURE 4. In a similar manner, the prior art attitude control system with fluid directed out of port 53 is capable of exerting a maximum reaction force of one unit upon vehicle 51 which will act about yaw axis 57. This force is illustrated by vector 62 in FIGURE 4. The prior art control system with the above two vectors combined is capable of exerting a maximum resultant reaction force or moment of 1.4 units upon vehicle 51 about an axis in a direction defined by bisecting the angle between pitch axis 56 and yaw axis 57 and thus between vectors 61, 62. This is accomplished by exerting a reaction force upon vehicle 51 equal to one unit of force along axis 56 and one unit of force along axis 57, simultaneously. The resultant force is illustrated by vector 63 in FIGURE 4. It is to be noted that the continuous flow is equal to two units of fluid energy.

FIGURE 5 is a schematic representation of the applicant's unique fluid attitude control system utilizing the simplified two axis control fluid amplifier means 25 for controlling a vehicle about two axes. FIGURE 5 is a schematic end view of a vehicle 51' having four outlet reaction ports identified by reference numerals 64, 65, 66 and 67 symmetrically positioned about its longitudinal axis. The pitch axis 56' of vehicle 51' lies in the plane of the drawing and bisects the angle between outlet ports 64 and 65. The yaw axis 57' of vehicle 51' is perpendicular to pitch axis 56', lies in the plane of the drawing and bisects the angle between outlet ports 65 and 66. The roll axis 58' of vehicle 51' is perpendicular to the plane of the drawing and perpendicular to both pitch axis 56' and yaw axis 57'. Outlet ports 64-67 are symmetrically positioned upon vehicle 51' about roll axis 58'. The control passages (not shown) controlling fluid flow in outlet ports 64 and 66 are positioned upon axis 57' and receive control signals from the yaw rate sensor. The control passages (not shown) controlling fluid flow in outlet ports 65 and 67 are positioned upon axis 56' and receive control signals from the pitch rate sensor. Fluid flow through outlet ports 64-67 is controlled by the applicant's unique fluid amplifier means 25. Fluid amplifier means 25 is a continuous flow device.

Assume for purposes of illustration that fluid amplifier means 25 is supplied continuously from passage 27 with 1.4 units of fluid energy so that the applicant's attitude control system utilizes a continuous flow of 1.4 units of fluid energy. Also assume that 1.4 units of fluid energy create a reaction force of 1.4 units when exhausted from vehicle 51'.

With vehicle residual motion rate input about pitch axis 56' or yaw axis 57' and no lateral wind, fluid amplifier means 25 directs the 1.4 units of fluid energy out one of outlet ports 64, 65, 66, 67 for one-half unit of time and directs the 1.4 units of fluid energy out the opposite one of these outlet ports for the other one-half unit of time. The operation of fluid amplifier means 25 in the absence of any input signal was discussed in detail with reference to FIGURE 2 and need not be repeated. The net force acting upon vehicle 51' over a full cycle is zero. Thus the applicant's fluid attitude control system continuously expends only 1.4 units of fluid energy.

The applicant's fluid attitude control system illustrated in FIGURE 5 is capable of exerting a reaction force of 1.4 units upon vehicle 51′ by directing the 1.4 units of fluid energy in the supply passage to exhaust through one of outlet ports 64, 65, 66 or 67. If the 1.4 units of fluid energy are directed out of outlet port 64, a maximum reaction force of 1.4 units (1.4F) similar to vector 61 in FIGURE 4 will act upon vehicle 51′ in a direction 45° to pitch axis 56′ and yaw axis 57′. This reaction force is illustrated by vector 68 in FIGURE 5. If the 1.4 units of fluid energy are directed out of outlet port 67, a maximum reaction force of 1.4 units (1.4F) similar to vector 62, FIGURE 4, will act upon vehicle 51′ in a direction 45° to pitch axis 56′ and yaw axis 57′. This force is illustrated by vector 68′ in FIGURE 5.

The applicant's attitude control system is capable of exerting a maximum reaction component force of one unit (1F) upon vehicle 51′ acting about pitch axis 56′. This is accomplished by directing 1.4 units of fluid energy through outlet port 64 for one half unit of time and directing 1.4 units of fluid energy through outlet port 67 through the other one unit of time. The net effect is a component force of one unit (1F) acting upon vehicle 51′ about pitch axis 56′ during one unit of time. This resultant force is illustrated by vector 69 in FIGURE 5. A maximum force of one unit can be applied to vehicle 51′ about yaw axis 57′ in an obvious manner. It should be noted that the applicant's fluid amplifier utilizes 1.4 units of fluid energy.

Thus the applicant's unique fluid attitude control system, utilizing simplified fluid amplifier means 25 for controlling a vehicle about the pitch and yaw axes, utilizes substantially less fluid energy than prior art systems using two independent bistable fluid amplifiers to control the attitude of a vehicle about two axes. More specifically, if the minimum desired output of each system is one unit of force applied to the vehicle in any direction, it is a simple matter to compare the amount of fluid energy required to obtain this force. From the previous discussion of the prior art system disclosed in FIGURE 4, it is clear that two units of fluid energy are necessary to obtain one unit of reaction force acting upon vehicle 51 about either the pitch axis 56 or the yaw axis 57. It should be noted that 1.4 units of force can be applied to vehicle 51 along a direction defined by disecting the angle between pitch axis 56 and yaw axis 57, but only one unit of force is required. The applicant's attitude control system on the other hand, as explained with reference to FIGURE 5, is capable of exerting 1.4 units of force upon vehicle 51′ in a direction defined by bisecting the angle between pitch axis 56′ and yaw axis 57′. The applicant's attitude control system can exert one unit of force acting upon vehicle 51′ about pitch axis 56′ or yaw axis 57′. Thus the applicant's control system provides a minimum of one unit of force acting upon vehicle 51′ in any direction while utilizing 1.4 units of fluid energy. The prior art systems require two units of fluid energy to provide a minimum of one unit of force in any direction.

Thus in the specific embodiment illustrated in FIGURE 5, the applicant's control system provides a thirty percent saving in fluid energy. It should be pointed out that since fluid amplifier control systems are constant flow devices, any saving of fluid energy is important. The applicant's system will provide a forty-five percent saving in fluid energy if a fluid amplifier means having eight outlet ports and eight control passages is utilized. In addition, the applicant's control system provides increased accuracy and reliability.

Figure 3:
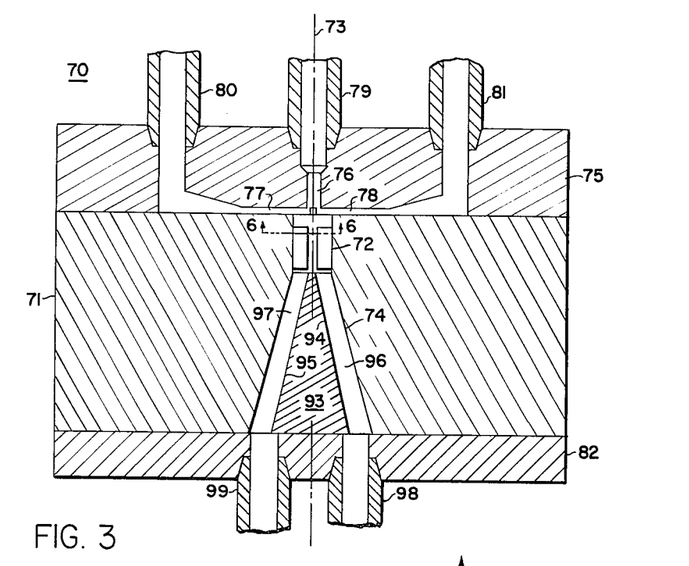
FIGURE 3 is a cross sectional view of an alternate embodiment of a fluid amplifier means.

An alternate embodiment of the applicant's fluid amplifier means is disclosed in FIGURE 3. Reference numeral 70 generally depicts a fluid amplifier means which functions to provide a multistable output signal in response to proportional control signals. A cylindrical housing means 71 is provided having a cylindrical mixing chamber 72 concentrically positioned therein. Mixing chamber 72 will be described in greater detail hereinafter. The longitudinal axis of chamber 72 is identified by reference numeral 73. A conical exit chamber 74 is located within housing 71 concentric with axis 73 and in communication with one end of mixing chamber 72.

A cylindrically shaped cover element 75 is attached to housing 71 by suitable means (not shown) such as adhesives or screws to housing 71 adjacent to the other end of mixing chamber 72. A supply passage 76 is located within element 75 concentric with axis 73 and in communication with mixing chamber 72. A pair of control passages 77 and 78 are provided within element 75 perpendicular to axis 73 and in communication with mixing chamber 72 and supply passage 76. It should be noted that two other control passages (77′, 78′ in FIGURE 6) are provided; however, they are not shown in the particular cross sectional view illustrated in FIGURE 3. Supply passage 76 is adapted to be connected to a high energy fluid source by connector means 79. Control passages 77 and 78 are adapted to be connected to rate sensor means generating a low energy proportional control signal by means of connectors 80 and 81 respectively.

Figure 6:
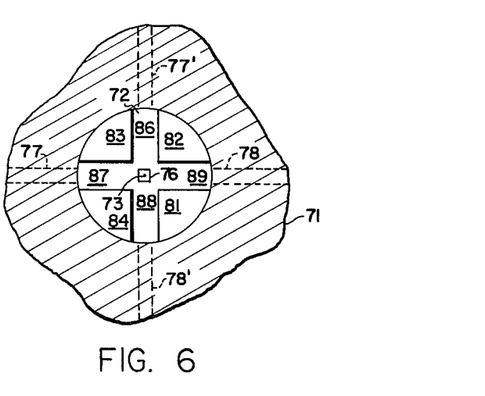
FIGURE 6 is a partial sectional view taken along section lines 6—6 of FIGURE 3.

Mixing chamber 72 is illustrated in cross section in FIGURE 6. A plurality of preshaped guide means 81, 82, 83, 84 are positioned within mixing chamber 72 and rigidly attached to housing 71 so as to define four longitudinal channels 86, 87, 88, 89. The longitudinal channels are substantially aligned parallel to the control passages although axially displaced therefrom. That is, longitudinal channel 87 is positioned within a longitudinal plane including axis 73 and control passage 77 and longitudinal channel 89 is positioned within a longitudinal plane including axis 73 and control passage 78.

A cylindrical base element 92 is attached to the other end of cylindrical housing 71. Base element 92 has a generally conical shaped element 93 centrally positioned thereon and rigidly attached thereto. Several U-shaped grooves are located on the surface of conical element 93. A pair of the grooves 94 and 95 are illustrated in FIGURE 3.

It should be noted that element 93 may have a different configuration than illustrated in FIGURE 3. For example, the grooves need not be of any particular cross section. The grooves could be eliminated and their function performed by attaching baffles to the surface of conical element 93. It is also possible to substitute baffles upon the periphery of exit chamber 74 to perform the function of element 93.

Element 93 and grooves 94 and 95 on the surface thereof cooperate with exit chamber 74 so as to form several fluid outlet ports symmetrically positioned about axis 73. A pair of outlet ports 96 and 97 are illustrated in FIGURE 3. The outlet ports are positioned relative to the control passages such that outlet ports 96 and 97 lie in a plane defined by control passages 77 and 78 and axis 73 (the plane of the drawing). A plurality of exhaust conduits are connected to base element 92 in communication with each of the several outlet ports. A pair of such exhaust conduits 98 and 99 are illustrated in FIGURE 3 in communication with outlet ports 96 and 97 respectively.

Characteristic interrelated dimensions of one embodiment of a fluid amplifier means such as illustrated in FIGURE 3 are as follows. The supply passage 76 has a width W; control passages 77 and 78 have a height (parallel to passage 76) of ⅓W and a width of W; mixing chamber 72 has a diameter of 3W and a length of 8W; conical chamber 74 has an included angle of 30°, the cone is truncated at a point where its diameter is equal to 3W and the truncated portion has a height of 12W; and outlet ports 86 and 87 have a diameter of 2W.

In operation, a fluid is supplied under high pressure through supply passage 76. A fluid stream flows from passage 76 having approximately the same diameter as the diameter thereof. It should be noted that guide means 81–84 allow a pressure differential to be developed across the supply stream. This is the phenomenon characteristic of a bistable fluid amplifier and allows the fluid flow to "lock on" to the wall of one of the channels, the so-called Coanda Effect.

Fluid amplifier 70 may also be utilized in the applicant's control system as a proportional output device. That is, by removing guide means 81–84, a low impedance flow path is provided around the fluid stream since chamber 72 has a greater diameter than the diameter of supply passage 76. This prevents a pressure differential from developing across the fluid stream and allows the amplifier to respond to proportional input signals so as to provide proportional output signals. That is, the high energy fluid flow through the supply passage exhausts through one or more of the outlet ports, the magnitude of the fluid flow from the outlet port or ports being indicative of the control signals.

Assume that control ports 77, 78 and outlet ports 96, 97 illustrated in FIGURE 3 are associated with control of a vehicle about the pitch axis. Theoretically, with no rate input about the pitch axis, control passages 77 and 78 will receive equal momentum signals from the pitch axis rate sensor. However, since the applicant's attitude control system functions in this embodiment with a bistable output, there will always be a rate input of a finite magnitude about the vehicle. Assume the rate input is about the pitch axis only. A pressure differential will exist between control passages 77 and 78. It should be noted that when a control signal is provided by the rate sensor, it is proportional in nature. Thus, except for a hard over condition, flow will occur in both control passage 77 and control passage 78. The difference therebetween is indicative of the applied rate about the pitch axis. The control signal may be in the form of a differential pressure between control passages 77 and 78 or in the form of a differential fluid flow. Assume that the pitch rate sensor signals for greater fluid flow through control passage 77 than through control passage 78. The fluid flowing from control passage 77 and from control passage 78 impinges upon the fluid stream flowing from supply passage 76 generally along axis 73. The low energy fluid flowing through control passages 77 and 78 and the high energy fluid flowing through supply passage 76 are subjected to a momentum interchange at the point of engagement. Vectorial analysis indicates that the resulting fluid flow will be in a direction having a slight angle with axis 73, that is displaced towards channel 89 and outlet port 96. It is clear that the predominate output signal will override the weaker control signal and deflect the supply stream accordingly. The fluid flow entering channel 89 will "lock on" to the wall defining the channel because of the boundary layer phenomena or Coanda Effect, and will remain in this orientation. Thus a bistable output is obtained from proportional control signals. The fluid flow exhausting from outlet port 96 will exert a moment or force upon the vehicle so as to oppose the applied rate input.

As stated previously, in this embodiment the applicant's attitude control system utilizes bistable output signals which results in a continual rate input about the vehicle. One special input condition would be an angular rate about the pitch axis only as previously described. In the usual case a rate input is applied to the vehicle about an axis other than the pitch axis and the yaw axis in which case all of the control passages 77, 77′, 78, 78′ of fluid amplifier means 70 will receive a control signal. Referring now to FIGURE 6, assume that the applied rate is such that both the pitch and the yaw rate sensors supply control signals to fluid amplifier means 70. Assume that control passage 77 receives a signal having a magnitude of 1 unit; control passage 78 receives a signal having a magnitude of 3 units; control passage 77′ receives a signal having a magnitude of 3½ units; and control passage 78′ receives a signal having a magnitude of ½ unit. It is clear that as between opposed control passages 77′, 78′ and 77, 78 the predominant signal will override the weaker signal as previously described. As between all four control signals, the predominant signal will override the other three and direct fluid flow out of one of the outlet ports opposite thereof so as to oppose the rate input about the axis about which it is greatest. Fluid amplifier means 70 will direct fluid flow out of one of the several outlet ports which will apply a moment to the vehicle about the pitch axis or the yaw axis, whichever axis senses the greatest rate. Vectorial analysis indicates, in the example given, that the resultant flow will occur through channel 88 and through the exhaust nozzle associated therewith. The fluid flow will continue through channel 88 until the reaction force upon the vehicle due to the fluid exhausting therefrom reduces the rate applied to the vehicle about that axis to a value less than the rate applied about the other axis. At this point, the control signal in one of the other channels will predominate and switch the fluid flow so as to exhaust from another outlet port.

Figure 7:
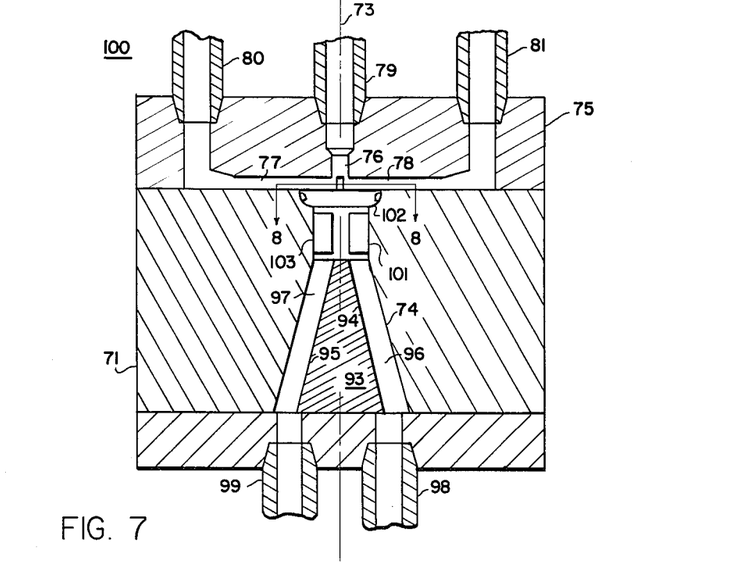
FIGURE 7 is a cross sectional view of an alternate embodiment of a fluid amplifier means.
Figure 8:
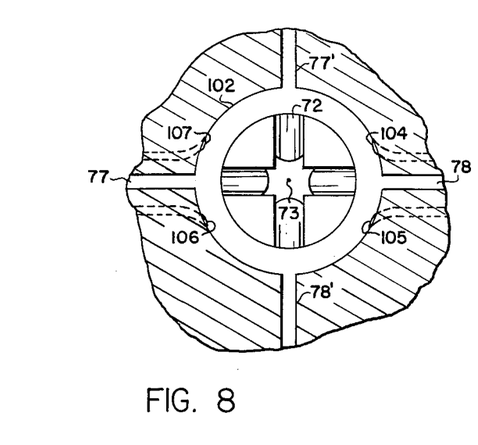
FIGURE 8 is a partial sectional view taken along section lines 8—8 of FIGURE 7.

Still another embodiment of the applicant's unique fluid amplifier means is illustrated in FIGURES 7 and 8. This fluid amplifier means is identified by reference numeral 100 and is adapted to substantially eliminate the effect upon the fluid attitude control system of rotation of the vehicle about its roll axis. That is, fluid amplifier means 100 substantially eliminates the effects of control time delay and spin rate upon the control system.

Fluid amplifier means 100 is structurally similar to fluid amplifier means 70 and like structural components will be identified with like reference numerals. The structural components illustrated in FIGURES 7 and 8 which are identical to the structural components illustrated in FIGURE 3 and described in detail with reference thereto will not be redescribed.

The basic difference between fluid amplifier means 70 and fluid amplifier means 100 is in the configuration of the mixing chamber. Mixing chamber 101 of fluid amplifier means 100 comprises an enlarged spherical portion 102 and cylindrical tube portion 103. The enlarged portion 102 is positioned adjacent to the end of supply passage 76 and in communication therewith. Tube portion 103 is in communication with outlet ports 98 and 99. It should be noted that other configurations of the mixing chamber are within the scope of the invention. Four roll compensation passages 104, 105, 106 and 107 are tangentially positioned about enlargement 102 and in communication therewith. The roll compensation passages are symmetrically positioned about axis 73 and in a plane perpendicular to axis 73 and supply passage 76. Fluid flow through the roll compensation passages produces a vortical fluid flow within enlarged portion 102 of chamber 101. Fluid flow through roll control passages 104 and 106 will produce vortical fluid flow having a counterclockwise direction as viewed in FIGURE 8. Fluid flow through roll control passages 105 and 107 will produce vortical fluid flow in a clockwise direction as viewed in FIGURE 8. Fluid flow through the roll control passages is controlled by a roll axis rate sensor and the magnitude of the roll control signal is a function of the roll rate of the vehicle.

The operation of fluid amplifier means 100 is similar to the operation of fluid amplifier means 70 with the exception that the resultant fluid flow is a function of both the control signals in the control passages associated with the pitch and yaw axes and the control signals in the roll control passages. The fluid supply stream is directed towards the suitable outlet port by the interaction of the control signals in the yaw and pitch control passages in the manner previously explained. Subsequent to this interaction of the control signals and the supply stream, the fluid flow is subjected to the roll control signals. With clockwise roll rate acting upon the vehicle, the outlet ports will be angularly displaced relative to axis 73 in a clockwise direction. Thus the reaction force applied to the vehicle due to the fluid exhausting therefrom will be applied in a direction angularly displaced from the direction called for by the control system. Consequently, the roll rate sensor directs fluid flow through roll control passages 104 and 106 thereby providing vortical fluid flow in a clockwise direction. The fluid flow from roll control passages impinges upon the fluid stream flowing through enlarged portion 102 and deflects the fluid stream in a counterclockwise direction to compensate for the roll rate of the vehicle.

Fluid amplifier 100 may also be utilized in the control system as a proportional output device by removing the guide means so as to provide a low impedance path. The functioning of a proportional output was described with reference to FIGURE 3 and need not be repeated.

Thus the applicant has provided a unique control system capable of controlling the attitude of a vehicle wherein fluid amplifier means are utilized which function to provide a bistable output in response to either bistable or proportional control signals, or function to provide a proportional output signal in response to proportional input signals. The applicant's control system provides increased efficiency, accuracy, and reliability over prior art control systems.

While I have shown and described specific embodiments of this invention, further modifications and improvements will occur to those skilled in the art. I desire it to be understood, therefore, that this invention is not limited to the particular forms shown and I intend in the appended claims to cover all modifications which do not depart from the spirit and scope of this invention.

What is claimed is:

1. In attitude control means for controlling the position of a vehicle: fluid amplifier means having a supply passage therein; means for supplying a high energy fluid to said supply passage; a plurality of control passages within said fluid amplifier; a chamber located within said fluid amplifier means in communication with said supply passage and said plurality of control passages; a plurality of compensating passages located within said fluid amplifier means and axially spaced from said control passages, said compensating passages being in communication with said chamber; a plurality of outlet ports within said fluid amplifier means and in communication with said chamber; means for providing low energy fluid flow in at least one of said control passages; and means for providing low energy fluid flow in at least one of said compensating passages, said amplifier means functioning to direct substantially all of the high energy fluid flowing from said supply passage through one of said outlet ports in response to the low energy fluid flow through said control passages and said compensating passages.

2. A fluid amplifier means comprising: housing means; a supply passage located within said housing and circumscribing an axis; a plurality of angularly spaced pairs of oppositely directed control passages within said housing symmetrically positioned about said axis and communicating with one end of said supply passage; a chamber located within said housing concentric with said axis having one end adjacent said end of said supply passage; guide means positioned within said chamber so as to provide a plurality of axial fluid conducting channels therein parallel to said axis; and a plurality of outlet ports located within said housing and in communication with the remaining end of said chamber, each port being in a plane including said axis and bisecting the angle between two adjacent control passages of said plurality of control passages, said supply passage, said control passages, and said outlet ports thereby being in communication with said chamber, said amplifier means functioning to receive a plurality of pairs of control signals comprising fluid flow through said control passages and direct substantially all of the fluid flowing through said supply passage to exhaust from only one of said outlet ports.

3. A fluid amplifier means comprising: housing means; a high energy fluid supply passage located within said housing and circumscribing an axis; a plurality of angularly spaced pairs of oppositely directed low energy fluid control passages within said housing symmetrically positioned about said axis and communicating with one end of said supply passage; a mixing chamber located within said housing concentric with said axis and having one end adjacent said end of said supply passage; guide means positioned within said chamber so as to provide a plurality of axial fluid conducting channels therein parallel to said axis; and a plurality of outlet ports located within said housing and in communication with the axial channels at the remaining end of said chamber, said outlet ports being symmetrically positioned about said axis, each port being in a plane defined by said axis and one of said control passages, said supply passage, said control passages, and said outlet ports thereby being in communication with said mixing chamber, said fluid amplifier means functioning to direct substantially all of the high energy fluid flowing through said supply passage to exhaust from only one of said outlet ports in response to the preponderant fluid flow through one of said plurality of control passages.

4. Fluid amplifier means comprising: housing means; a supply passage located within said housing and circumscribing an axis; a plurality of pairs of oppositely directed control passages within said housing symmetrically positioned about said axis and communicating with one end of said supply passage; an elongated chamber having an enlarged portion and a tube portion located within said housing, said enlarged portion of said chamber being positioned adjacent to said one end of said supply passage; a plurality of compensating passages within said housing axially spaced from said control passages, said compensating passages being symmetrically positioned about said axis and in communication with said enlarged portion of said chamber; guide means positioned within said tube portion of said chamber so as to provide a plurality of axial channels therein substantially parallel to said axis; and a plurality of outlet ports located within said housing and in communication with said tube portion of said chamber, said outlet ports being symmetrically positioned about said axis, each port being in a plane including said axis and bisecting the angle between two adjacent passages of said plurality of control passages, said supply passage, said control passages, said compenating passages and said outlet ports thereby being in communication with said chamber, said fluid amplifier means functioning to direct substantially all of the fluid flowing through said supply passage to exhaust from only one of said outlet ports in response to fluid flow through said control passages and fluid flow through said compensating passages.

5. Fluid amplifier means comprising: housing means; a supply passage located within said housing parallel to an axis; a plurality of control passages within said housing symmetrically positioned about said axis and communicating with one end of said supply passage; a chamber within said housing, one end of said chamber being positioned adjacent to said one end of said supply passage; a plurality of compensating passages within said housing axially spaced from said control passages, said compensating passages being symmetrically positioned about said axis and in communication with said chambers; and a plurality of outlet ports located within said housing in communication with said chamber, said outlet ports being symmetrically positioned about said axis, each port being in a plane defined by said axis and one of said control passages, said supply passage, said control passages, said compensating passages, and said outlet ports thereby being in communication with said chamber, said amplifier means functioning to receive a plurality of control signals comprising fluid flow through said control passages and to receive compensating signals comprising fluid flow through said compensating passages and thereby direct substantially all of the fluid flowing through said supply passage to exhaust from only one of said outlet ports.

6. In rate damper control means for controlling a craft about two respectively perpendicular axes thereof by reaction force: a multistable fluid amplifier having four fluid outlet ports therein angularly spaced in two respectively orthogonal planes, fluid flow in any one outlet port applying a moment about the center of gravity of said craft for controlling the rate thereof about an axis at an angle to said two axes; means for supplying fluid to said fluid amplifier, said fluid amplifier having two pairs of oppositely directed control passages therein axially spaced from said outlet ports the two pairs along with said axes being in two respectively orthogonal planes, said control passages being angularly positioned intermediate said outlet ports; a first device sensing angular rate about one axis; a second device sensing angular rate about the other axis; and means responsive to said devices for providing fluid flow in two of said control passages of both pairs greater than the flow of the other two passages in both pairs, the fluid flow within said two control passages being effective to direct substantially all of the fluid flow from the high pressure supply means through one of said outlet ports so as to control the angular rate of the craft about the two perpendicular axes.

7. In rate damper control means for a craft: a fluid amplifier having more than two fluid outlet ports therein, fluid flow in any one of said outlet ports being effective to apply a turning moment about the center of gravity of said craft for controlling the rate thereof about an axis; means providing a cavity within said fluid amplifier in communication with said outlet ports and adapted for receiving high energy fluid; a plurality of pairs of oppositely directed control passages within said fluid amplifier the passages in each pair being in axial alignment and in communication with said cavity; and sensing means responsive to craft angular rate about an axis thereof for providing fluid flow within at least one of said passages of said plurality of pairs of control passages in excess of that in the other passages, the fluid flow within said one of said control passages being effective to direct substantially all of the high energy fluid flow through two of said outlet ports alternately so as to control the rate of the craft about the axis of which the rate was sensed.

8. In attitude control means for a craft: sensing means responsive to a function of change in craft position about a plurality of axes; a fluid amplifier for controlling the craft about two axes having a plurality of angularly spaced fluid outlet ports therein, fluid flow in any one of said outlet ports being effective to apply a moment about the center of gravity of said craft; a fluid mixing chamber within said fluid amplifier in communication with said outlet ports; means for supplying high energy fluid to said mixing chamber; a plurality of pairs of oppositely directed control passages in a plane parallel with the plane formed by said axes and within said fluid amplifier intersecting said chamber, said pairs being angularly spaced; and means responsive to the sensing means for providing low energy fluid flow in at least one of said control passages in excess of that in the other passages, the fluid flow within said one control passage being effective to direct substantially all of the high energy fluid flow through two of said outlet ports alternately so as to control the attitude of the craft about an axis to cause change in craft position.

9. Attitude control means for controlling a vehicle comprising: sensing means responsive to a function of vehicle position; a fluid amplifier having a plurality of angularly spaced fluid outlet ports therein, any one of said outlet ports having fluid flow therein for controlling said vehicle attitude about an axis by reaction force; a plurality of pairs of fluid control passages within said fluid amplifier the fluid in the passages in each pair being oppositely directed said pairs being angularly spaced; a chamber within said fluid amplifier in communication with said outlet ports and said control passages; means for supplying high energy fluid to said chamber; and means responsive to the sensing means for providing a different fluid flow within at least one of said control passages of each pair from that of the other passages of the corresponding pair, fluid flow through said control passages thereby directing substantially all of the high energy fluid to flow through one of said plurality of outlet ports so as to control the attitude of the vehicle.

10. In attitude control means for controlling a vehicle: a fluid amplifier having $2+n$, where $n$ is a whole number, angularly displaced fluid outlet ports therein; $2+n$ angularly spaced low energy fluid control passages within said fluid amplifier; a supply passage for receiving high energy fluid in said fluid amplifier; a chamber within said fluid amplifier, said supply passage, said outlet ports, and said control passages being in communication with said chamber; and means for providing a control signal within at least one of said $2+n$ control passages different from the control signals in the other passages so as to direct substantially all of the high energy fluid flow from said supply passage through selected outlet ports so as to control the attitude of said vehicle to alter its position.

11. In attitude control means for controlling a vehicle: a fluid amplifier having at least four angularly spaced fluid outlet ports therein; at least four angularly spaced low energy fluid control passages within said fluid amplifier the passages being paired and the pairs being in orthogonal planes to provide said angular spacing; a supply passage for said fluid amplifier; a chamber within said fluid amplifier, said supply passage, said outlet ports, and said control passages being in communication with said chamber; means for conducting a high energy fluid to said supply passage; and means for providing pairs of proportional control signals within said pairs of control passages so as to direct the high energy fluid flow from said supply passage through said outlet ports corresponding with the control signals within the control passages, the fluid flow through said outlet ports being indicative of the relative magnitudes of said control signals.

12. In a fluid amplifier type control apparatus: an amplifier comprising a housing; a supply passage within said housing parallel to an axis of said housing, said supply passage adapted to receive a continuous stream of high energy fluid; more than two control passages within said housing communicating with said supply passage at one end thereof symmetrically angularly positioned about said axis at least one control port being in a plane containing said axis which is at an angle to a plane containing said axis and two other control ports; a mixing chamber located within said housing aligned with said axis and in communication with said supply passage and said control passages; and more than two fluid outlet ports within said housing symmetrically located about said axis and communicating with said chamber at least one outlet port being in a plane containing said axis which plane is at an angle to a plane containing said axis and two other outlet ports, said control passages being positioned about said axis relative to said outlet ports such that at least one of said outlet ports lies in a plane including said axis and one of said control passages, said amplifier being effective to direct substantially all of the high energy fluid flowing through said supply passage to exhaust through one of said outlet ports in response to any preponderant fluid flow in said control passages.

13. In a fluid amplifier type control apparatus: an amplifier comprising a housing; a single supply passage within said housing parallel to an axis, said supply passage adapted to receive and transmit a continuous stream of high energy fluid, four control passages within said housing communicating with said supply passage at one end thereof and symmetrically positioned about said axis, two control passages and said axis defining a plane which is at an angle to a plane defined by two other control passages and said axis; a fluid mixing chamber located within said housing aligned with said axis and in communication with said supply passage and said control passages; and four fluid outlet ports within said housing symmetrically located about said axis and communicating with said chamber, said control passages being positioned about said axis relative to said outlet ports such that any one of said outlet ports lies in a plane including said axis and one of said control passages, said fluid amplifier being effective to direct the high energy fluid flowing through said supply passage to exhaust preponderantly through one of said outlet ports in response to greater fluid flow in one of said four control passages than in the other three.

14. In a fluid amplifier type control apparatus: an amplifier comprising a housing; a supply passage within said housing parallel to an axis; a plurality of control passages within said housing communicating with said supply passage at one end thereof and symmetrically positioned about said axis in a plane perpendicular to said axis; a fluid mixing chamber located within said housing aligned with said axis and in communication with said supply passage and said control passages; a plurality of compensating passages within said housing symmetrically located about said axis and in communication with said chamber said compensating passages operatively connected to said chamber and adapted to oppose the effects on the flow from the supply due to rotation about said axis; and a plurality of fluid outlet ports within said housing symmetrically located about said axis and in communication with said chamber, said control passages being positioned about said axis relative to said outlet ports such that at least one of said outlet ports lies in a plane defined by said axis and one of said control passages.

References Cited by the Examiner

UNITED STATES PATENTS

| | | | |
|---|---|---|---|
| 2,169,982 | 8/1939 | Von Manteuffel | 137—83 X |
| 2,315,167 | 3/1943 | Von Manteuffel | 137—83 X |
| 2,904,057 | 9/1959 | Callender et al. | 137—83 |
| 3,001,539 | 9/1961 | Hurvitz | 137—83 |
| 3,004,547 | 10/1961 | Hurvitz | 137—83 |
| 3,111,291 | 11/1963 | Horton | 244—78 |
| 3,122,165 | 2/1964 | Horton | 244—78 X |
| 3,124,160 | 3/1964 | Zilberfarb | 137—83 X |

MILTON BUCHLER, *Primary Examiner.*

ANDREW H. FARRELL, FERGUS S. MIDDLETON,
*Examiners.*